(12) United States Patent
Elgersma et al.

(10) Patent No.: US 12,170,026 B2
(45) Date of Patent: Dec. 17, 2024

(54) METHOD AND SYSTEM FOR PLANNING VEHICLE TRAJECTORIES BY ENHANCING EN ROUTE NAVIGATION PERFORMANCE

(71) Applicant: Honeywell International Inc., Charlotte, NC (US)

(72) Inventors: Michael Ray Elgersma, Plymouth, MN (US); Vibhor L Bageshwar, Rosemount, MN (US)

(73) Assignee: Honeywell International Inc., Charlotte, NC (US)

( * ) Notice: Subject to any disclaimer, the term of this patent is extended or adjusted under 35 U.S.C. 154(b) by 729 days.

(21) Appl. No.: 17/350,959

(22) Filed: Jun. 17, 2021

(65) Prior Publication Data

US 2022/0406197 A1    Dec. 22, 2022

(51) Int. Cl.
| | | |
|---|---|---|
| *G08G 5/00* | (2006.01) | |
| *G01S 19/47* | (2010.01) | |
| *G06V 10/44* | (2022.01) | |
| *G06V 20/13* | (2022.01) | |

(52) U.S. Cl.
CPC ............ *G08G 5/0034* (2013.01); *G01S 19/47* (2013.01); *G06V 10/44* (2022.01); *G06V 20/13* (2022.01); *G08G 5/0047* (2013.01)

(58) Field of Classification Search
CPC .. G08G 5/0034; G08G 5/0047; G08G 5/0021; G08G 5/0086; G08G 5/045; G08G 5/0069; G01S 19/47; G06V 10/44; G06V 20/13; G06V 10/457; G01C 21/1656
See application file for complete search history.

(56) References Cited

U.S. PATENT DOCUMENTS

| | | |
|---|---|---|
| 9,996,944 B2 | 6/2018 | Aghamohammadi et al. |
| 10,093,021 B2 | 10/2018 | Aghamohammadi et al. |
| 10,809,064 B2 | 10/2020 | Ingersoll et al. |
| 2015/0345967 A1 | 12/2015 | Meuleau |
| 2020/0174481 A1 | 6/2020 | Van Heukelom et al. |
| 2021/0018322 A1 | 1/2021 | Jiang et al. |

OTHER PUBLICATIONS

Bageshwar, Vibhor L. et al., "Integrity Monitoring of Vehicle Kinematic States Using Map-Based, Vision Navigation Systems", U.S. Appl. No. 17/380,916, filed Jul. 20, 2021, pp. 1 through 46, Published: US.

(Continued)

*Primary Examiner* — Aniss Chad
*Assistant Examiner* — Chase L Cooley
(74) *Attorney, Agent, or Firm* — Fogg & Powers LLC

(57) ABSTRACT

A method for planning a vehicle trajectory is provided. The method comprises obtaining an edge map representation corresponding to one or more terrain images of a given area, and identifying a total number of edge pixels in each of a plurality of sub-regions of the edge map representation. The method further comprises determining a measurement probability density function (PDF) for each of the sub-regions based on the number of edge pixels with information content in each sub-region. The method then computes a trajectory cost for each of the sub-regions by dividing a user-selected scalar by a sum of: a user-selected value and the number of edge pixels with information content in each sub-region. Thereafter, the method selects a trajectory for navigation of a vehicle over the given area based on the trajectory cost for each of the sub-regions.

19 Claims, 11 Drawing Sheets

(56) References Cited

OTHER PUBLICATIONS

Bageshwar et al., "Integrity of Range Measurements", U.S. Appl. No. 17/237,841, filed Apr. 22, 2021; pp. 1-44.
Bar-Gill, "Improvement of Terrain-Aided Navigation via Trajectory Optimization", IEEE Transactions on Control Systems Technology, Dec. 1994, pp. 336 through 342, vol. 2, No. 4, IEEE.
Elgersma et al., "Position Probability Density Function Filter To Determine Real-Time Measurement Errors for Map Based, Vision Navigation Systems", U.S. Appl. No. 17/340,921, filed Jun. 7, 2021; pp. 1-52.

METHOD AND SYSTEM FOR PLANNING VEHICLE TRAJECTORIES BY ENHANCING EN ROUTE NAVIGATION PERFORMANCE

BACKGROUND

Manned and unmanned vehicles use guidance systems to plan trajectories from an initial location to a target location through and over different types of terrain. These trajectories are often selected using a wide variety of different criteria and implemented using various techniques that make use of the chosen criteria to plan the trajectory path. Different criteria parameters for selecting trajectories include time, distance, fuel cost, and others. Many trajectory planning techniques aim to minimize the time, distance, or both time and distance so that the vehicle reaches the target location in the fastest time possible, shortest distance possible, or a combination of both. This approach generally improves efficiency through the reduction of distance traveled by the vehicle, which can reduce fuel costs.

A significant flaw with these techniques, however, is that they fail to compensate for navigation estimation errors calculated during the trajectory path. The vehicle kinematic state statistics estimated by navigation systems suffer from inherent estimation errors in analyzing inertial data. These navigation errors can lead the vehicle astray from its intended destination, thereby nullifying the predicted benefits that come with using trajectory optimization techniques. In particular, a navigation system requires a period of time and information content to recover from the estimation errors of the vehicle kinematic state statistics caused by inertial measurement unit (IMU) measurement errors in Global Navigation Satellite System (GNSS)-denied conditions. Further, GNSS technology can be jammed or spoofed at certain points during vehicle operation, thus leaving the vehicle to utilize alternative navigation techniques (e.g., IMUs coupled with strapdown inertial navigations systems and coupled with aiding sensors such as radar, Light Detection and Ranging (LiDAR), electro-optical cameras, infrared cameras, star trackers, and the like), or continue operating without accurate estimated kinematic state statistics at its own risk.

A need therefore arises for vehicle trajectory planning techniques that optimize trajectory selection based on the performance of navigation systems onboard the vehicle.

SUMMARY

A method for planning a vehicle trajectory is provided. The method comprises obtaining an edge map representation corresponding to one or more terrain images of a given area, and identifying a total number of edge pixels in each of a plurality of sub-regions of the edge map representation. The method further comprises determining a measurement probability density function (PDF) for each of the sub-regions based on the number of edge pixels with information content in each sub-region. The method then computes a trajectory cost for each of the sub-regions by dividing a user-selected scalar by a sum of: a user-selected value and the number of edge pixels with information content in each sub-region. Thereafter, the method selects a trajectory for navigation of a vehicle over the given area based on the trajectory cost for each of the sub-regions.

DRAWINGS

Understanding that the drawings depict only exemplary embodiments and are not therefore to be considered limiting in scope, the exemplary embodiments will be described with additional specificity and detail through the use of the accompanying drawings, in which.

Figure 6A:
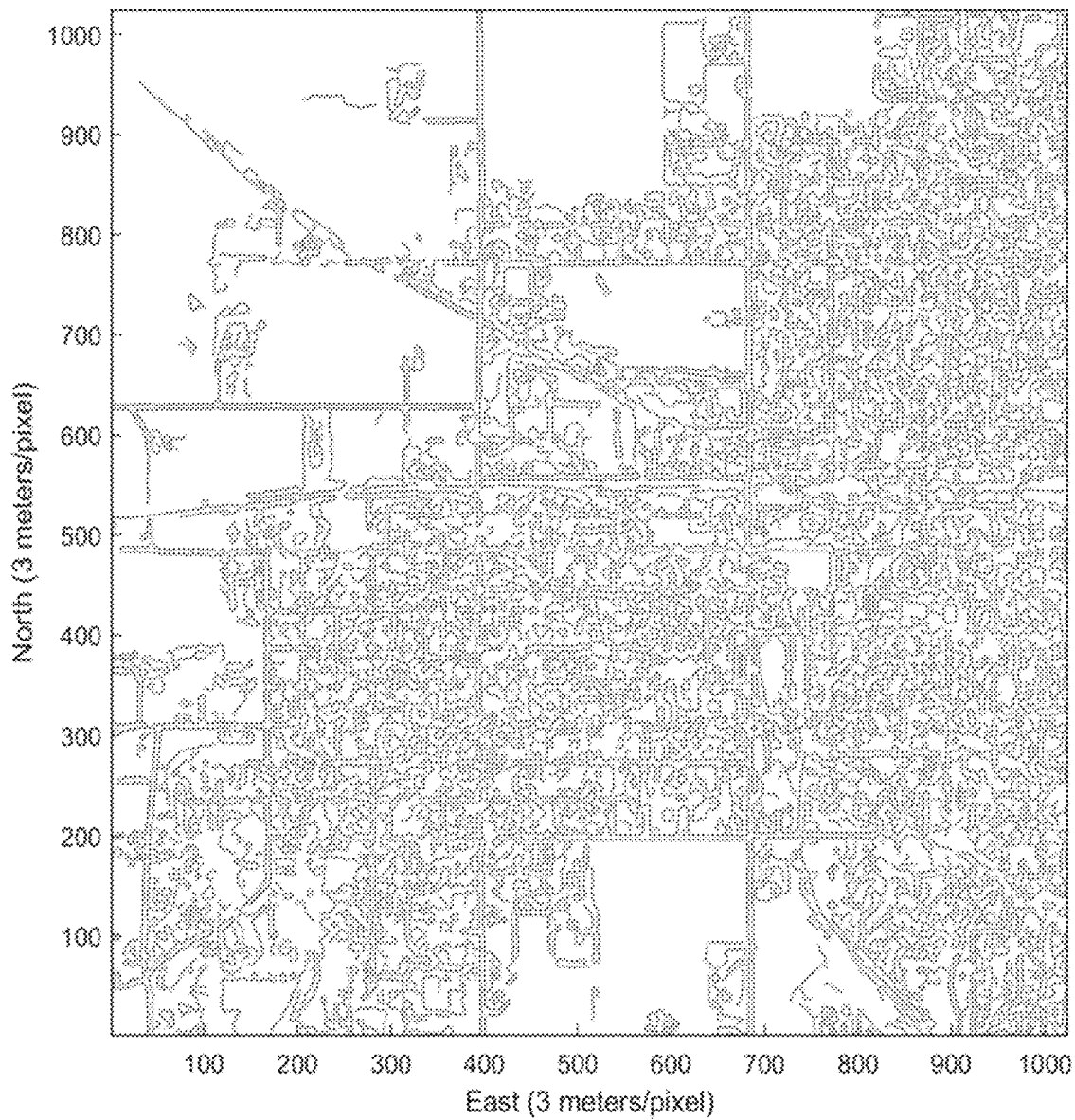
Figure 6B:
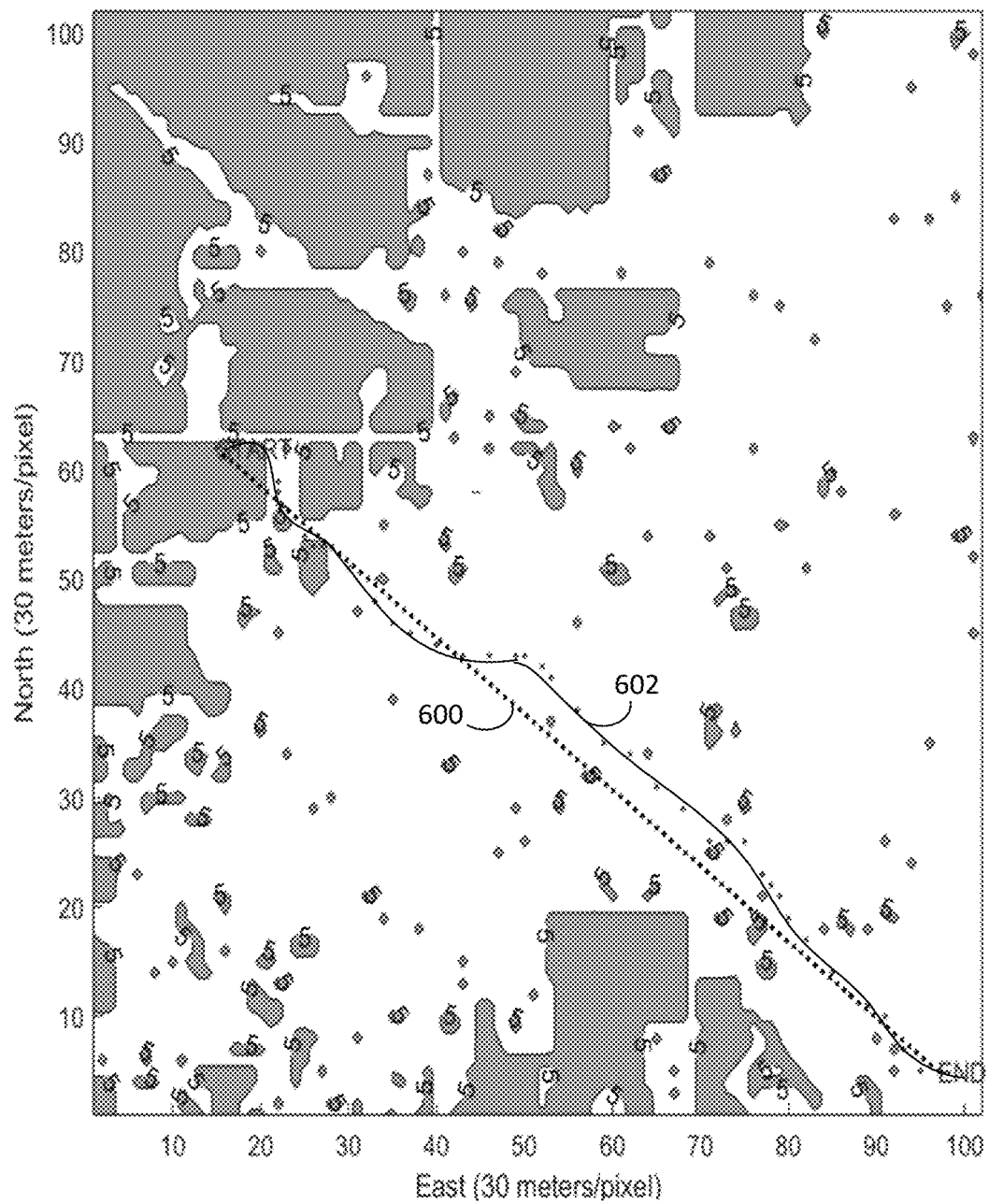
Figure 7A:
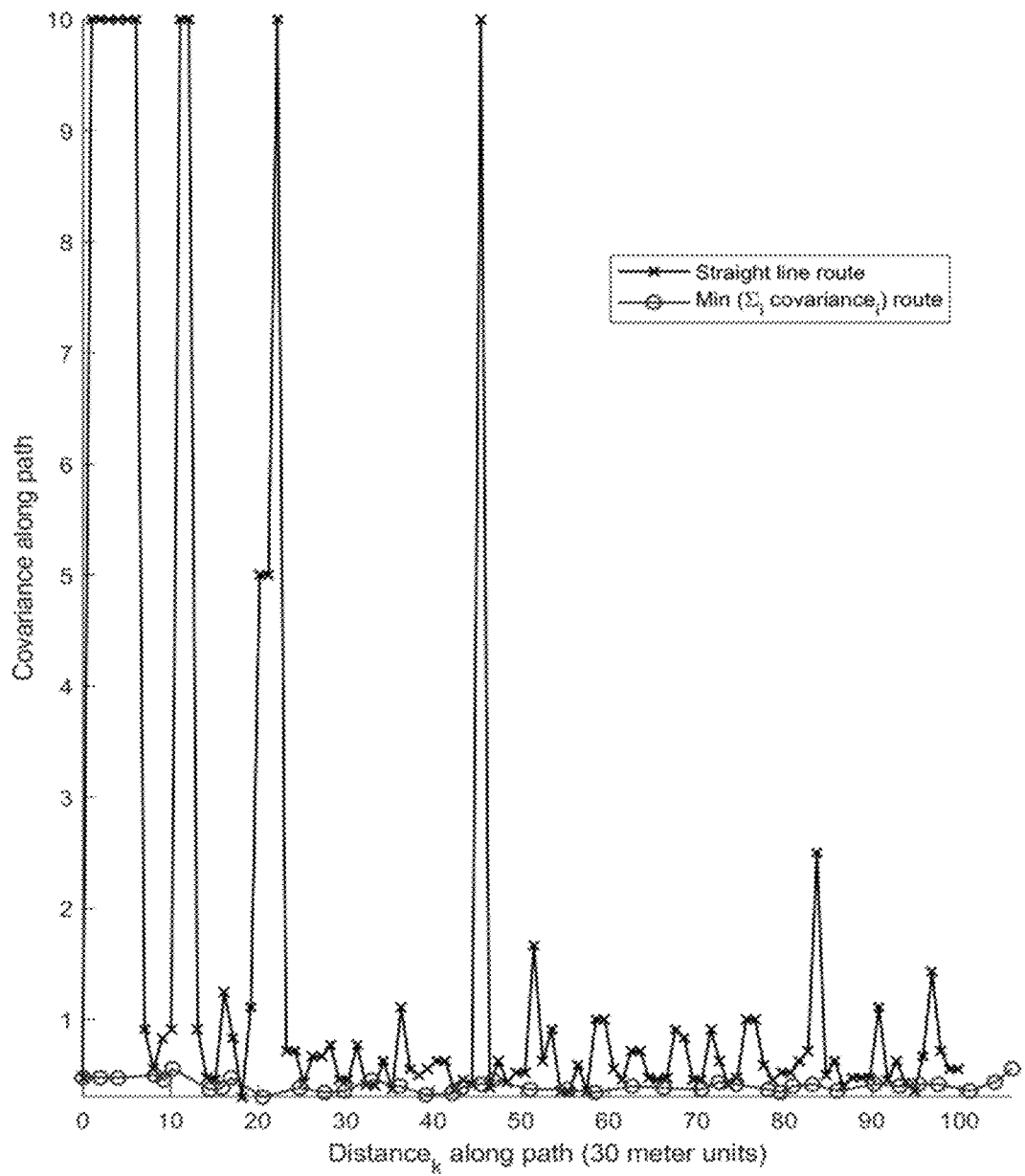
Figure 7B:
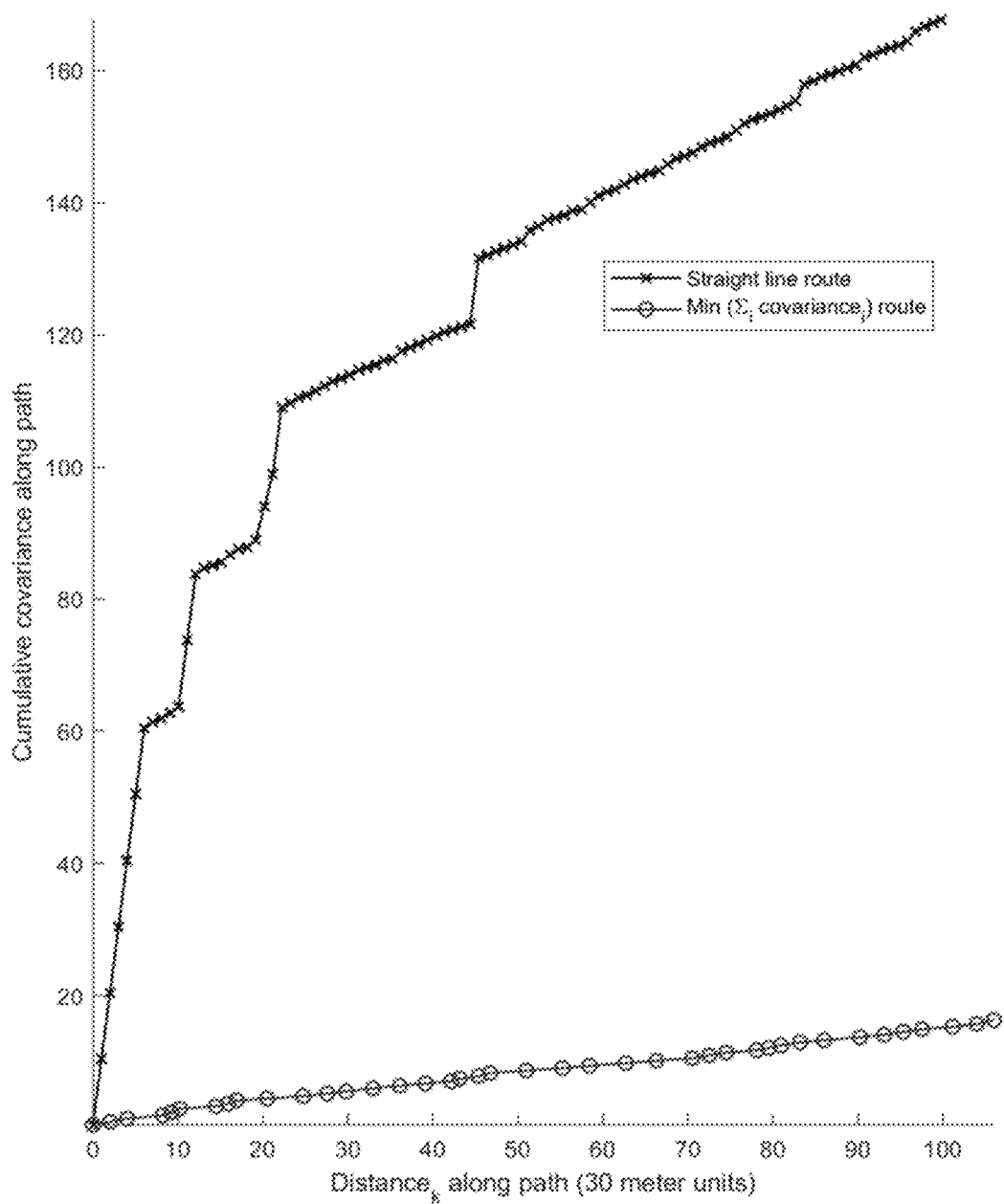

FIGS. 6A and 6B are an exemplary edge map corresponding to a given terrain area and a graphical representation of a vehicle trajectory route as compared with a minimal distance route between the vehicle and a target location in the given terrain area, respectfully; and FIGS. 7A and 7B are graphical representations of covariance and cumulated covariance, respectively, as a function of the distance along the paths for the vehicle trajectory and minimal distance routes in FIG. 6B.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A method and system for planning trajectories by optimizing en route vehicle navigation performance is described herein. The embodiments described herein utilize information acquired from terrain features observed using vision sensors (such as radar, LiDAR, electro-optical cameras, and infrared cameras) to plan a trajectory path for the vehicle that reduces or minimizes en route navigation errors. Such information can be extracted from distinctive ground features such as roads, buildings, shorelines, rock formations, etc. Therefore, the described embodiments plan trajectories that traverse through regions that maximize the information content of a given terrain area. Reducing the aggregated en route navigation error enables the vehicle and personnel onboard to determine where the vehicle is relative to its target destination, which can be particularly advantageous in GNSS-denied, jammed, or spoofed environments where aiding sensors such as vision sensors are used to aid the IMU in navigation systems.

This approach also has the advantage of being applied in real-time. If the vision-based sensor's field of view is restricted by obscurants (i.e., weather) or if the ground features have changed since the map's creation, then feature probability density functions computed from images measured by the vision sensors can be compared to the feature probability density functions computed from the map to determine loss of information content and whether the trajectory should be altered mid-flight.

Further details of various embodiments are described hereafter with reference to the drawings.

Figure 1:
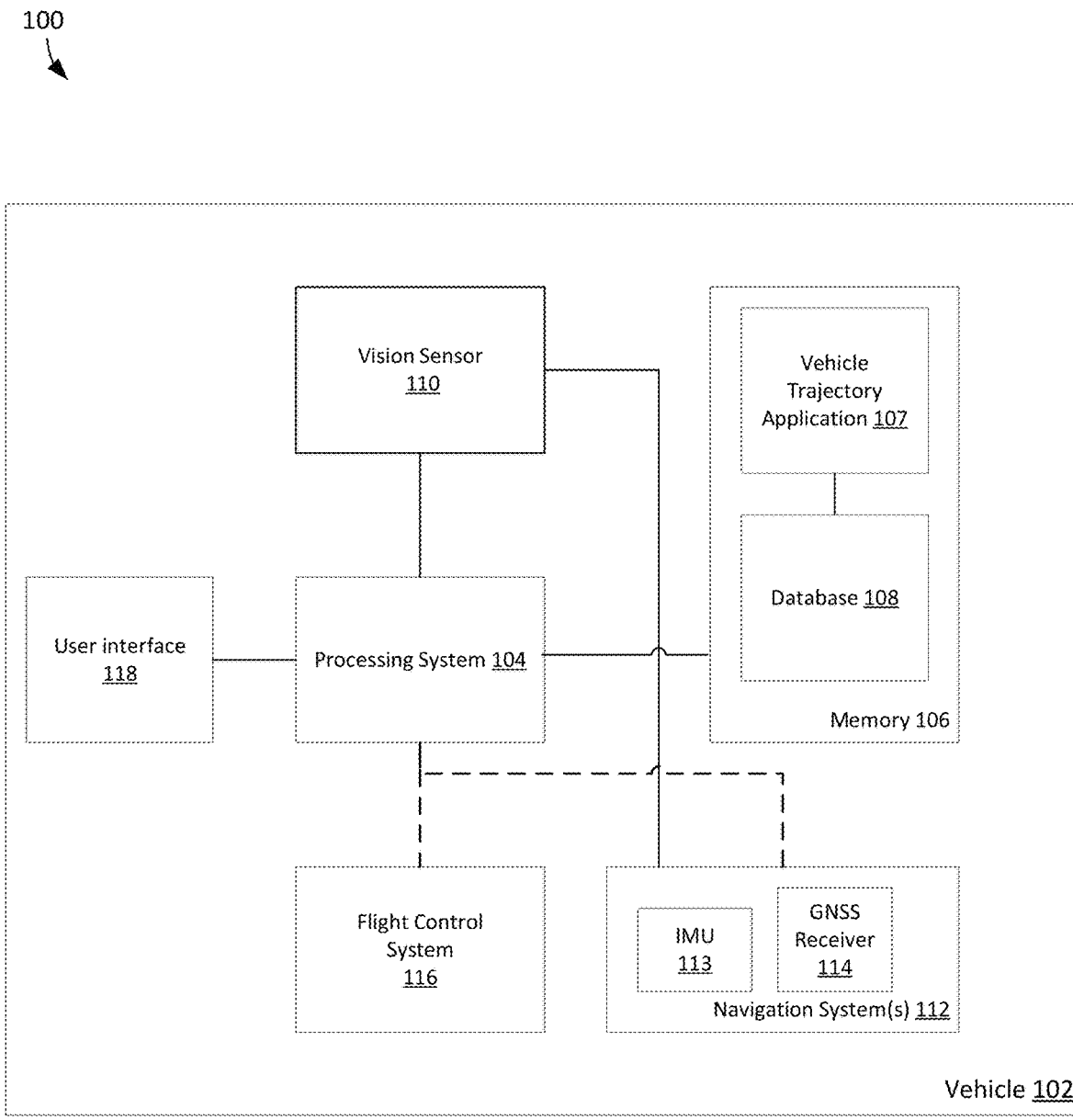
FIG. 1 is a block diagram of a vehicle trajectory enhancement system, according to one or more embodiments.

FIG. 1 is a block diagram of a vehicle trajectory enhancement system (system) 100 implemented on a vehicle 102, which in some embodiments is an aircraft. As used herein, the term "vehicle" encompasses the breadth as understood by one having ordinary skill in the art, and would include but not be limited to, various aerial traversing vehicles (e.g., commercial, non-commercial, or recreational aircraft), including unmanned aircraft systems (e.g., urban air mobility vehicles), and the like.

System 100 is operative to generate a trajectory path for vehicle 102 to a target destination. For example, personnel controlling an aircraft, such as pilots, can specify a target destination before a flight by inputting an end location through a user interface 118. In some examples, user interface 118 is a human-machine interface such as a graphical user interface (GUI), touch-screen display, or the like, which the operator can interact with to add or change target destinations and other flight parameters. While system 100 can set a flight trajectory path before a flight, in some embodiments system 100 can be modified during flight as well through user input. In some embodiments, the trajectory path can be adjusted automatically based on new information captured by vehicle 102, for example, by adjusting the flight path trajectory based on the changing position of vehicle 102. However, for unmanned vehicles, such as drones and smaller urban air mobility (UAM) vehicles, user interface 118 can be communicatively coupled to a processing system 104 through a separate computing device, such as a smartphone, tablet, computer, personal digital assistant (PDA), or other mobile device.

The vehicle 102 may include at least one vision sensor 110, such as a camera, configured to acquire images of the external environment over which vehicle 102 traverses. In some embodiments, vision sensor 110 is located at the bottom of an aircraft and configured to acquire images of the terrain below the aircraft during flight. While vision sensor 110 can be mounted on vehicle 102, vision sensor 110 is an optional component of system 100 because map images may be previously stored in database 108, for example, from another aircraft, where they can be accessed by aircraft 102 for planning a trajectory path to the target destination. Structurally, the vision sensor 110 includes any kind of device configured to capture images of the terrain surrounding the vehicle, but in some embodiments, can include a camera or video recorder.

Once a target location is specified, processing system 104 is configured to determine a flight trajectory path that reduces or minimizes the uncertainty of the aircraft's position over the given flight path area. Processing system 104 may include any one or combination of processors, microprocessors, digital signal processors, application specific integrated circuits, field programmable gate arrays, and/or other similar variants thereof. Processing system 104 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

For example, processing system 104 can function with or include a memory 106 coupled to the processing system 104. Memory 106 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. In software or firmware embodiments, memory 106 includes computer-readable instructions for performing a vehicle trajectory planning method, such as the method described in FIG. 2 and illustrated in system 100 as vehicle trajectory application 107.

Memory 106 also includes a database 108 which stores acquired map images of the terrain at a corresponding geographic location. That is, in some embodiments database 108 contains map images that portray the terrain landscape for geographic locations that at least span the aircraft's trajectory path. The map images may be acquired a priori before the aircraft begins the flight, or may be taken by the aircraft during flight (e.g. by vision sensor 110) and processed by processing system 104. Database 108 can also include information corresponding to each stored image that describes physical data of the terrain area captured by each map image. For example, database 108 can include accompanying position data such as geographical coordinates (e.g. latitude and longitude or other coordinate reference system) of where the map image was taken. In some embodiments, the map image can also include information on physical features of the terrain in the map image, such as the height of notable landmarks (e.g. buildings, rock formations, etc.). If map images are captured by vision sensor 110, then processing system 104 can send terrain position data received by the acquired images and add or update the terrain position data in database 108.

Data processed by processing system 104 can be output to other external or internal operating systems of aircraft 102. As shown in FIG. 1, system 100 optionally includes a flight control system 116 and navigation system 112 coupled to processing system 104, but other systems can also be coupled as well. Flight control system 116 and navigation system 112 are operative to receive the aircraft trajectory path from processing system 104, where it can be used for additional processing. For example, the flight trajectory path can be compared with inertial measurements from IMU 113 and/or position information acquired from GNSS receiver 114 and vision sensor 110. Alternatively, some embodiments may also update navigation solutions calculated by navigation system 112. The flight trajectory path determined via vehicle trajectory application 107 can be sent to other systems as well (or stored in memory 106).

Figure 2:
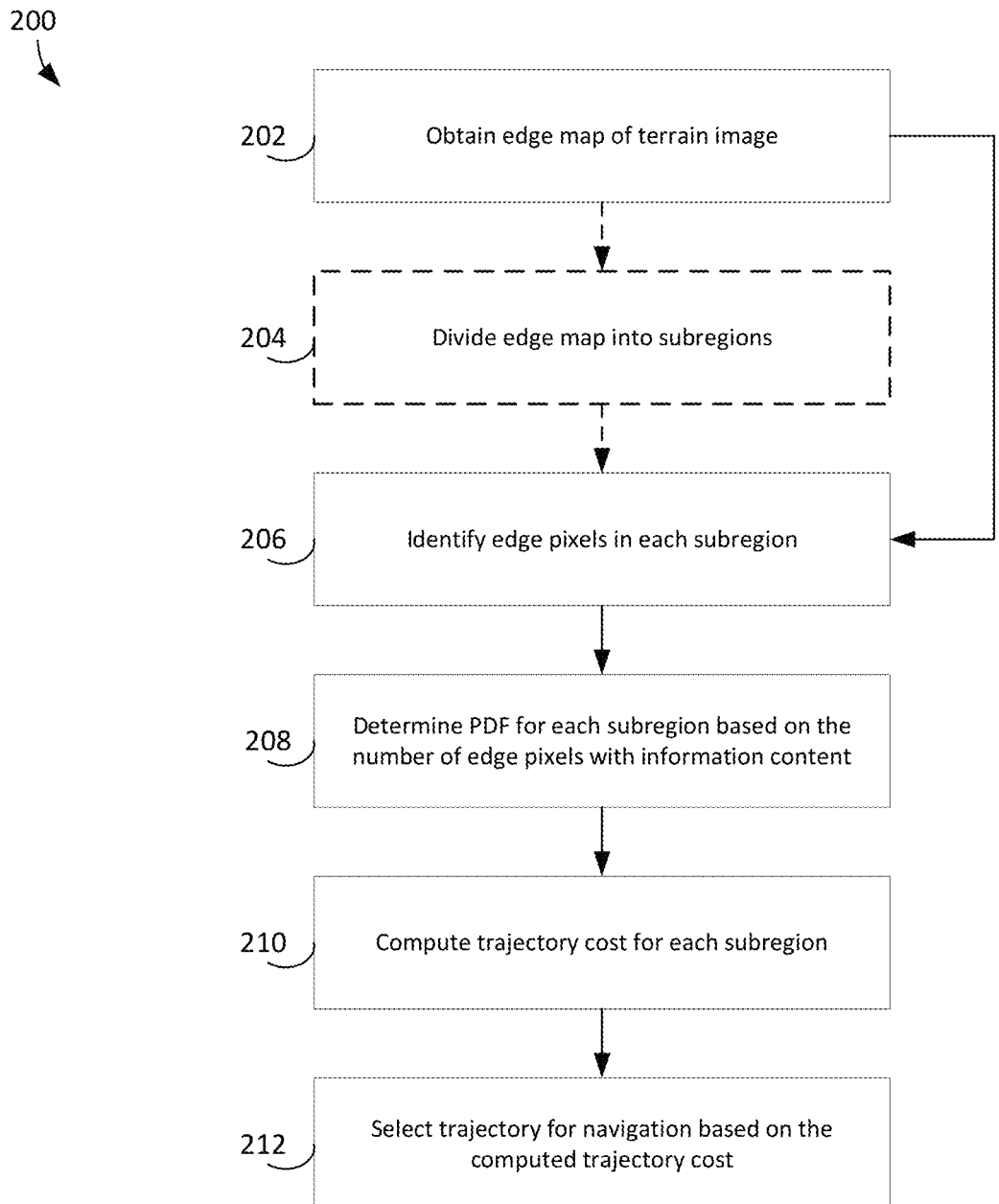
FIG. 2 is a flow diagram of a method for enhancing the planning of a vehicle trajectory, according to one or more implementations.

FIG. 2 is a flow diagram of a method 200 for enhancing the planning of a vehicle trajectory. Method 200 may be implemented as instructions stored in memory (e.g. vehicle trajectory application 107) executed by a processing system (e.g. processing system 104. Steps of the method will be described with reference to the structural features described above with respect to FIG. 1 with the understanding that the methodology can be performed by other hardware or firmware as well.

Method 200 begins at block 202 by obtaining an edge map representation of one or more map images of a given area. Referring back to FIG. 1, in some embodiments, processing system 104 accesses database 108 to acquire one or more terrain map images. In some embodiments, processing system 104 can then perform edge map processing techniques on the acquired terrain map images to extract edge features from the stored images. Edges are features associated with contrasting physical differences in the terrain. Common edges include shorelines to lakes, rivers, seas, oceans, sharp rock features, roads, building, and other distinctive terrain features. Such edge features can be identified using conventionally known edge detection techniques, such as Canny edge detection algorithms. However, in other embodiments, database 108 includes edge map representations of the given terrain area, and processing system 104 accesses the stored edge maps.

Method 200 can optionally proceed to block 204 by partitioning the edge map representation into a plurality of subregions. For example, the edge map representation may be partitioned into subregions of equal dimensions (e.g. 100×100 pixel squares), in which each pixel corresponds to a square area of the terrain; however, the partitioned subregions do not need to be of equal dimensions to perform the method. In other embodiments, the number and/or area of the subregions corresponds to the area of the map images. That is, the area of each subregion can be selected to be smaller for very large terrain images and vice versa. However, block 204 is optional because while partitioning the edge map representation may advantageously reduce the processing load for computing a vehicle trajectory path and increase the accuracy of the trajectory path, it is not required to do so.

Proceeding to block 206 (either from block 202 or block 204), method 200 identifies the total number of edge pixels with information content in the edge map representation, for example, for each subregion of the edge map. These edge pixels contain information about structural features in the terrain, which can thereby provide a basis to determine the position of the aircraft based on the differences in terrain seen by the vision sensor 110 mounted on the aircraft. Such information can be used to plan the aircraft's flight trajectory in a way that takes advantage of the distinctive terrain environment so that the aircraft has a greater accuracy of pinpointing its location during the flight trajectory. These terrain-based navigation techniques are particularly advantageous when the GNSS such as the Global Positioning System (GPS) cannot be used, for example, in cases where the GPS becomes inoperable due to system failure, or due to external interference with GPS signals (such as GPS jamming and GPS spoofing events).

Referring back to method 200, at block 208, method 200 determines a measurement probability density function (PDF) for each subregion based on the number of edge pixels with information content in each subregion. As known in the art, a PDF has many representations. In this case, a PDF is a representation of the likelihood that a given terrain area has features. The PDF in a technical sense would mean the probability of orienting the edge map representation in a particular manner that would match the perspective given by the aircraft (e.g. through an image captured by vision sensor 110). In some embodiments, the PDF can be illustrated as a graphical representation, with the vertical (dependent) axis corresponding to a magnitude as a function of the probability of the horizontal (independent) axis for set edge map orientations. Thus, the orientations with the highest peaks would correspond to the greatest likelihood that the vehicle position would match the position of the oriented edge map representation. Further details on computing measurement PDFs can be found in the U.S. patent application titled "POSITION PROBABILITY DENSITY FUNCTION FILTER TO DETERMINE REAL-TIME MEASUREMENT ERRORS FOR MAP BASED, VISION NAVIGATION SYSTEMS," application Ser. No. 17/340,921, now U.S. Pat. No. 11,609,093, the contents of which is hereby incorporated by reference in its entirety.

When method 200 determines the measurement PDF of a given terrain area, it can then determine a path trajectory utilizing the measurement PDF that reduces or minimizes the uncertainty of the vehicle's location. Existing vehicle trajectory planning algorithms calculate the path that is "optimal" based on a wide multitude of factors, such as the total distance to the target destination, estimated time to reach the destination, etc., and determine an optimal path that reduces the magnitude of those quantities so that the vehicle travels for less distance or time. In contrast, method 200 determines a vehicle trajectory based on the information cost associated with the given terrain area. Thus, while trajectories plotted by method 200 can result in a path that travels more distance or takes more time, the vehicle trajectory can reduce or even minimize the errors associated with where the vehicle is located at any given time. A path that improves en route navigation, even one that ultimately takes longer than a minimum distance path, makes inertial systems more reliable by reducing the drift error used in navigation calculations (and subsequently the recovery time necessary to recalibrate inertial sensors from drift error).

Thus, proceeding to block 210, method 200 computes a trajectory cost for each subregion utilizing the corresponding measurement PDF of each subregion. The trajectory cost is a measure of the uncertainty or error in extrapolating the position of the aircraft based on the computed measurement PDFs. In some embodiments, the trajectory cost is computed based on the highest uncertainty of the path, or the uncertainty at the end of the path (for example, by calculating the norm of a covariance at those points in the path). However, an easier technique is to calculate the trajectory cost based on the uncertainty over all points in the path of a given measurement PDF. Therefore, in some embodiments, the trajectory cost is based on the covariance of each measurement PDF, calculated based on the following equation $$\text{Cost} = \frac{A}{B + \alpha} \quad \text{(Equation 1)}$$

where A and B are constants and a is the total number of edge map pixels that correspond to edge features in each subregion. The constants A and B can be values that are predetermined, for example, user-selected values, so that the equation can be adapted for a particular type of environment. The constant A, for example, can be given a real valued quantity, which in some embodiments can be one (1). In some embodiments, A corresponds to the size of the subregion, for example, if each subregion has an area of 10×10 pixels, then A can be selected to have a value of 10. Likewise, B can be set to a non-zero real quantity to compensate for areas with no detectable edge pixels (e.g. over large bodies of water or farmlands) so as to avoid dividing by a denominator of zero. The effect of the weight B will decrease as the number of edge pixels a tends to very large quantities (areas with many edge pixels). In one example, a region highly dense with edge features will correspond to a lower trajectory cost. If A and B are both 1 (of course, A and B can be dissimilar quantities) and the number of edge pixels is 500, then the trajectory cost would be:

$$\text{Cost} = \frac{1}{1+500} = \frac{1}{501}$$

However, for regions with sparsely populated edges (e.g. $\alpha=0$), the trajectory cost would be:

$$\text{Cost} = \frac{1}{1+0} = 1$$

which means the cost of navigating through a sparsely populated edge region is much higher than a densely populated one, or to put another way, extrapolating the aircraft's position in a sparsely populated edge region will create much more uncertainty than doing so in a densely populated edge region.

At block 212, method 200 selects a trajectory for aircraft guidance that reduces or minimizes navigation errors of the aircraft based on the computed trajectory cost. For example, method 200 can calculate the trajectory cost that reduces or minimizes the uncertainty in the position of the aircraft by selecting the trajectory that minimizes the total trajectory cost in each subregion over the possible vectors the aircraft can take. Conventionally used algorithms can be used to determine the flight trajectory, such as Dijkstra's algorithm, which can be stored in memory 106 and executed by processing system 104.

In some embodiments, additional factors may also be considered in selecting the navigation trajectory. For example, environmental factors such as inclement weather can be included in Equation 1 if known a priori in the case of weather reports received before flight, or can be used to update the vehicle trajectory during flight. Additionally, terrain-based threats can also be considered to minimize exposure of the vehicle in high-risk areas, by including a factor representing the hazard level of the terrain-based threat to the cost function described above. Equation 1 can be modified to include these 'hazard parameters' so that the trajectory path reduces or minimizes any terrain-based threats to the aircraft. For example, an additional constant or quantity representing the hazard parameter over a given terrain area or sub-region can be added (or otherwise modified) to the information cost parameter (the information cost parameter represented as the quantity $$\frac{A}{B+\alpha}$$

to calculate or update the trajectory path.

Figure 3:
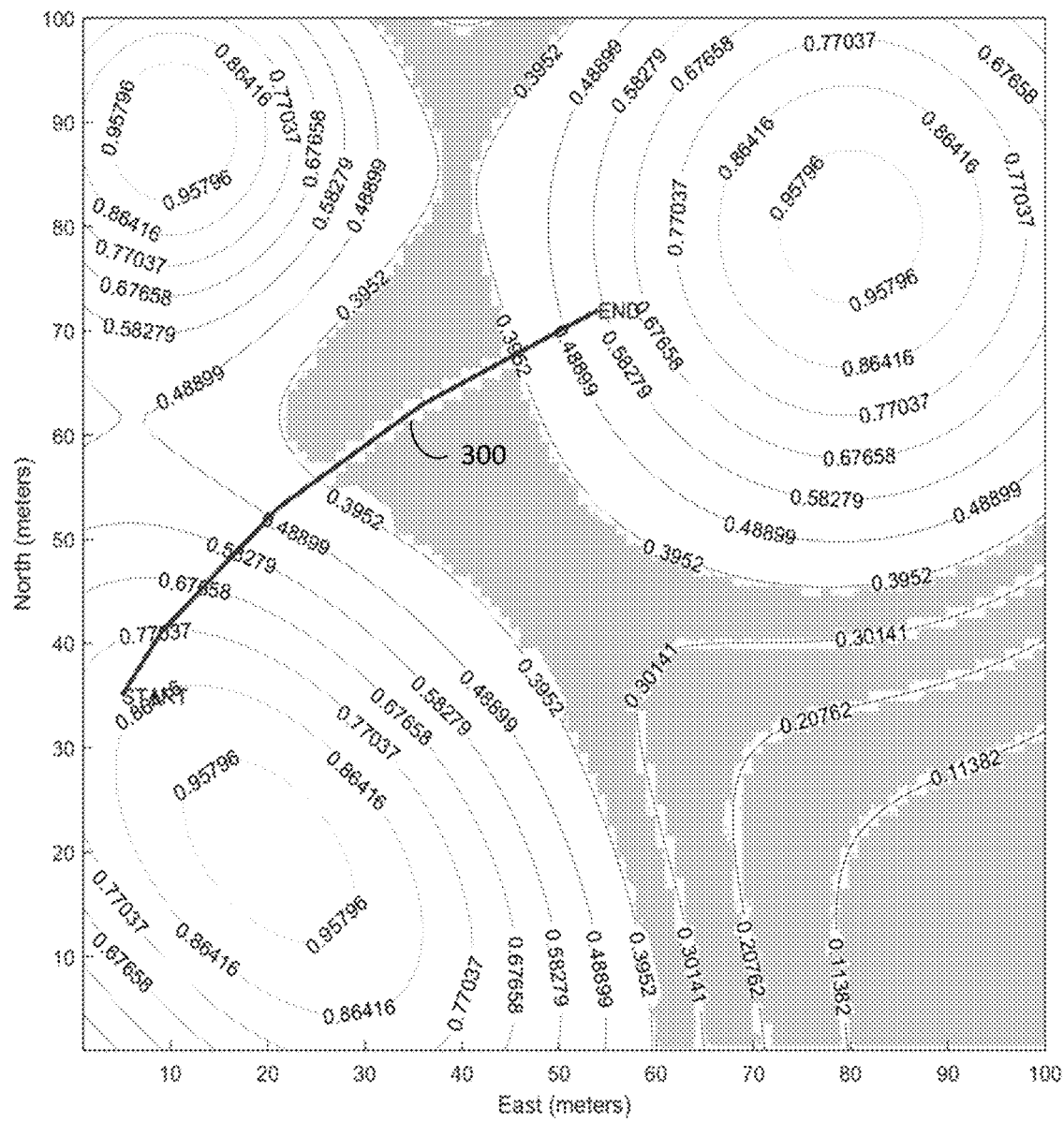
FIG. 3 is a graphical representation of an exemplary vehicle trajectory path through a given terrain area.

FIG. 3 is a graphical representation of an exemplary vehicle trajectory path 300 through a given terrain area, which minimizes the sum of costs along the path. A northeast coordinate system is shown, in which the vertical axis illustrates the distance (meters) in the North direction from the origin (bottom left corner), while the horizontal axis illustrates the distance (meters) in the East direction from the origin. FIG. 3 includes multiple subregions with corresponding trajectory costs associated with each subregion. In FIG. 3, each trajectory cost is normalized to a value of 1, indicating the degree of uncertainty of extrapolating the vehicle's position in each subregion. Therefore, regions with higher values (trajectory costs) correspond to high uncertainty areas with relatively low detectable edge features, such as agricultural areas and bodies of water. Areas with no edge features will have a trajectory cost of 1 in the example shown in FIG. 3.

The techniques described above calculate the vehicle trajectory path that avoids traversing through these high-cost areas when possible. In FIG. 3, the vehicle starts at a relatively high trajectory cost area between 0.86416 and 0.77037 (marked as "START"). The path 300 to the end destination (END) traverses through the relatively low-cost areas farther North of the vehicle's starting position rather than traversing through the higher cost areas farther East. As a result, the path 300 is chosen to reduce the distance spent in higher cost regions, which means the vehicle spends more time traveling through terrain with more edge features (or more defined edge features). The vehicle can also be configured to travel at a faster velocity through the higher cost regions to the extent it must travel through them to reduce or minimize the time spent through such regions. Particularly when GNSS technology is unavailable, the navigation system cannot take advantage of the vision sensors 110 for terrain that lacks edge features, since the errors of the vehicle kinematic states estimated by the navigation system increase at a faster rate when traveling through higher cost regions. Traversing through the path 300 as shown in FIG. 3 can reduce or minimize the effect of inertial drift in the navigation's system estimates of the vehicle kinematic state statistics.

Figure 4A:
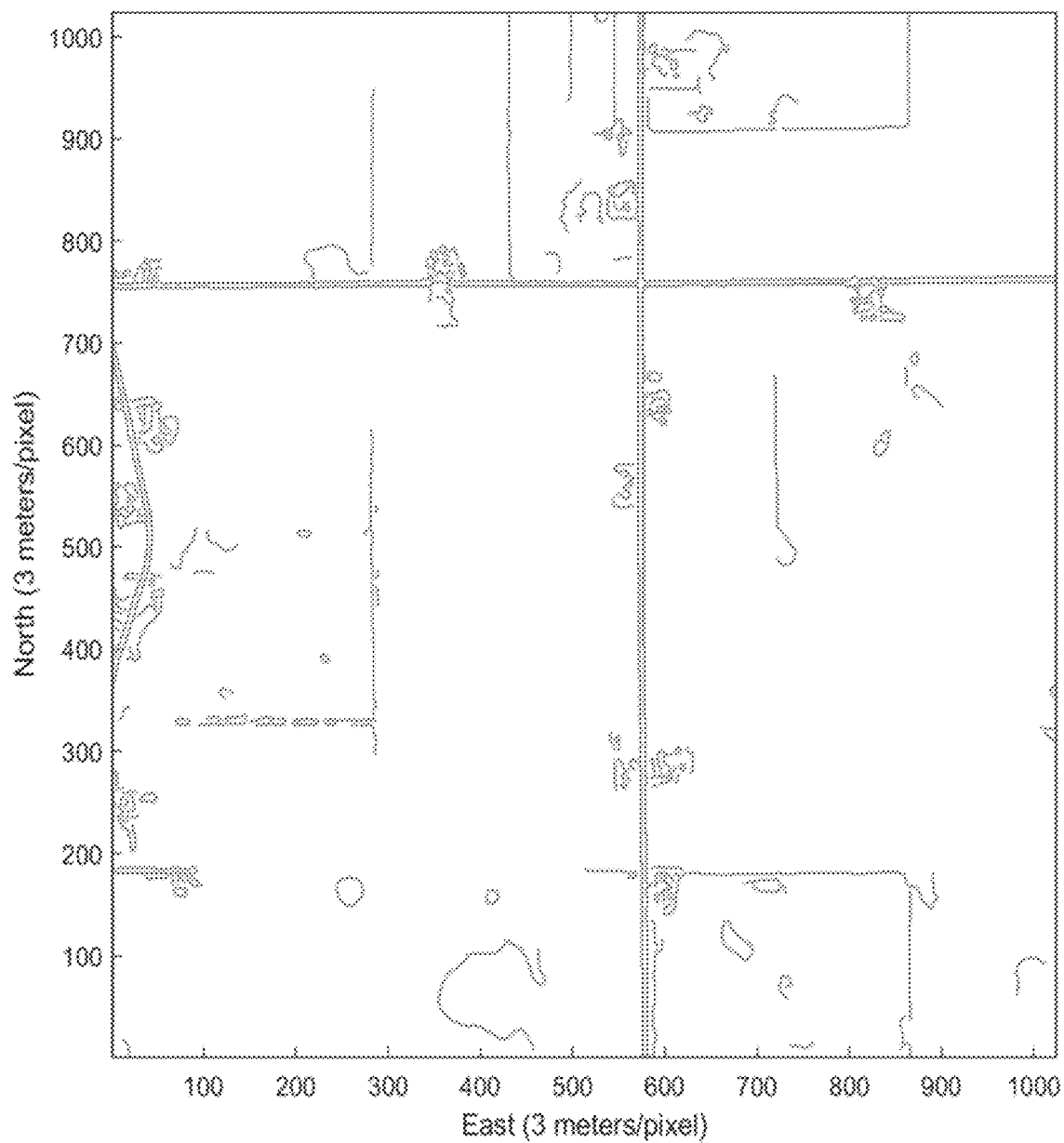
FIGS. 4A and 4B are an exemplary edge map corresponding to a given terrain area, and a graphical representation of a vehicle trajectory route as compared with a minimal distance route between the vehicle and a target location in the given terrain area, respectfully.
Figure 4B:
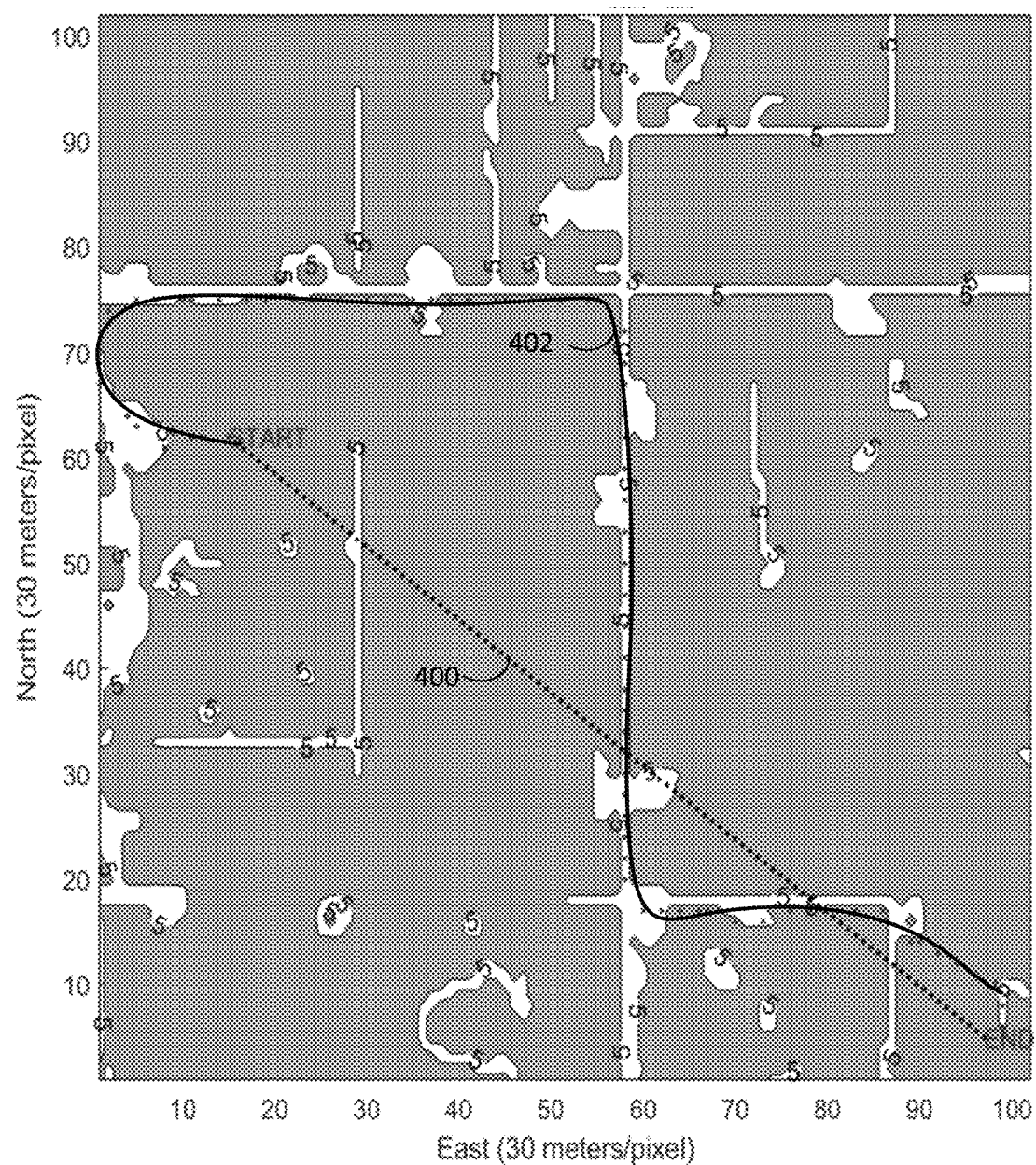

FIGS. 4A and 4B illustrate an example simulation of planning a vehicle trajectory that minimizes the sum of cost along the path.

FIG. 4A is an exemplary edge map of a given rural area used for the simulation. The edge map contains a lower density of edge features, because of the rural area, which are used in planning the vehicle trajectory.

FIG. 4B is a graphical representation of a vehicle trajectory route 402 as compared with a minimal distance path 400 between a start location and a target location. A 100×100 meter map of a given terrain area is shown, which can be partitioned into subregions. Some edge features (shown in white) permeate the landscape, which can be from roads, buildings, or distinct terrain features; however, the remaining portions of the terrain (shown in gray) comprise relatively few edge features.

A dotted line from the initial location ("START") to the target destination ("END") indicates path 400 between the two points that minimizes the distance between them. However, a substantial portion of path 400 traverses through the featureless region of the terrain, thereby rendering path 400 as a high-cost en route navigation performance path that presents an increased risk that the vehicle could get lost if it were to travel based on this plotted trajectory.

In contrast, trajectory path 402 represents an exemplary path calculated using the techniques described above. Instead of traversing directly towards the target destination, trajectory path 402 follows the defined edge features north of the vehicle's initial location before turning south. Although the vehicle traverses more distance, trajectory path 402, calculated using the techniques described above, can improve en route navigation performance by reducing navigation errors from traveling through regions with low information content.

Figure 5A:
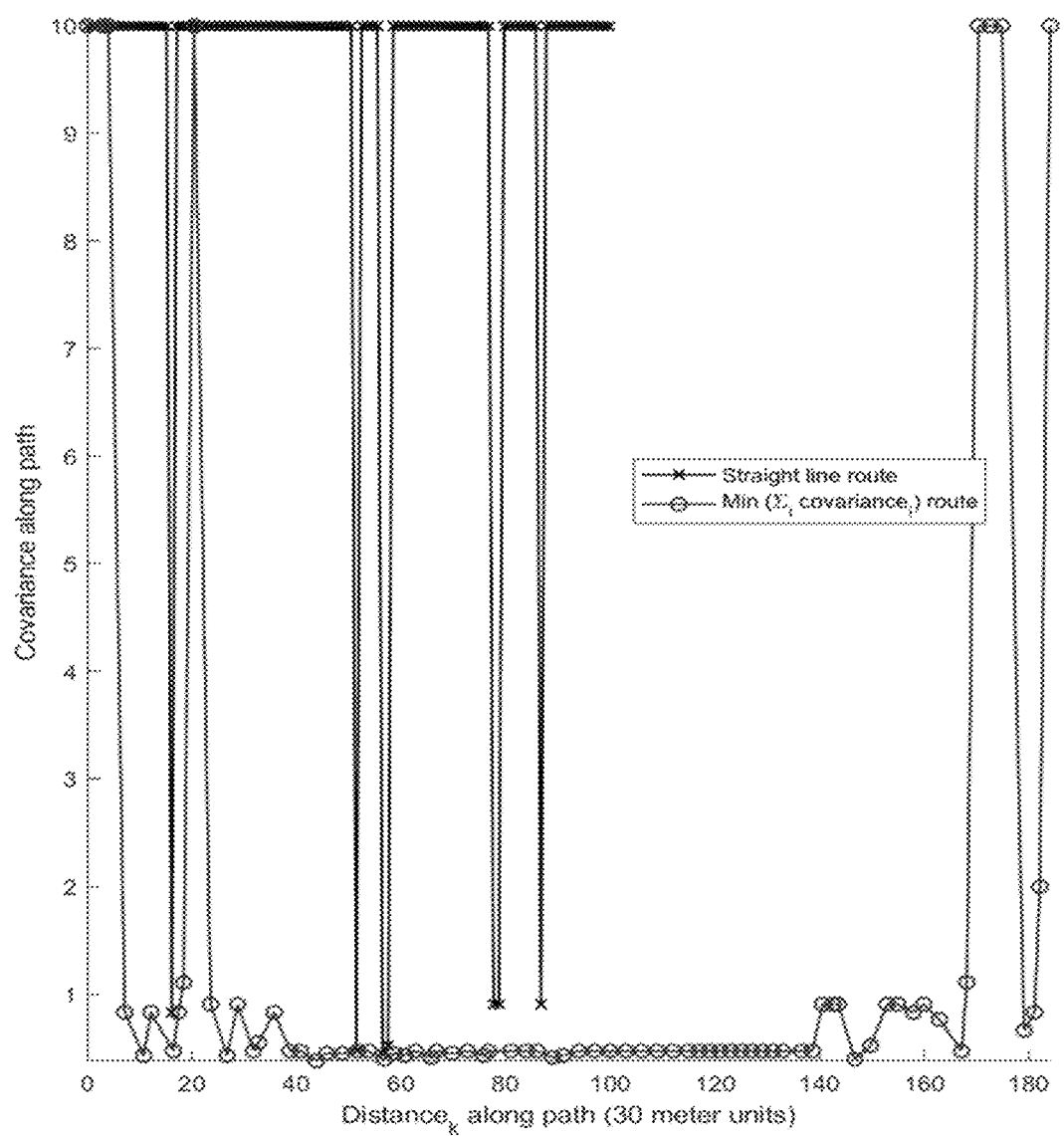
FIGS. 5A and 5B are graphical representations of covariance and cumulated covariance, respectively, as a function of the distance along the paths for the vehicle trajectory and minimal distance routes in FIG. 4B.
Figure 5B:
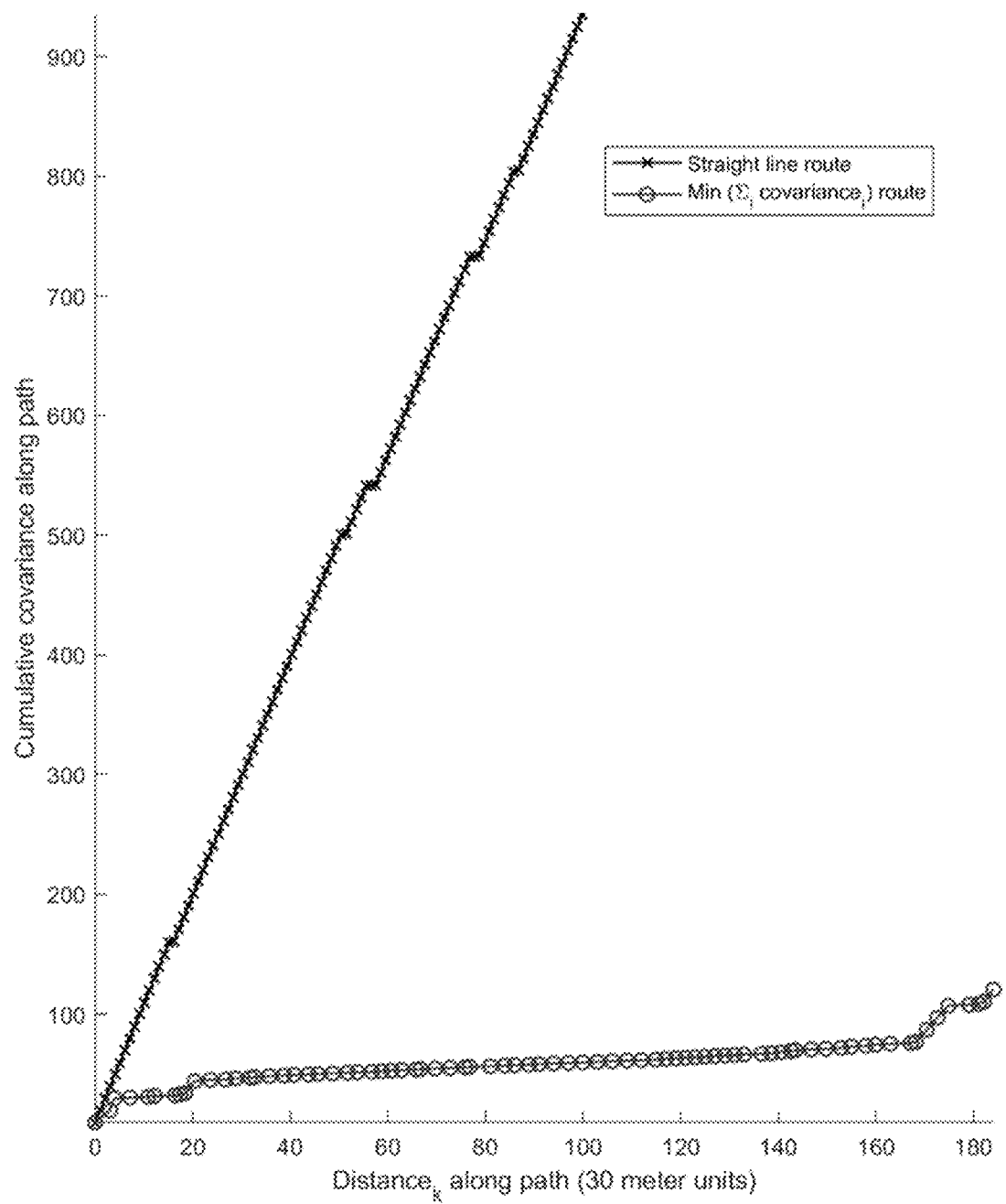

FIGS. 5A and 5B are graphical representations of position covariance and cumulated position covariance, respectively, as a function of the distance along the trajectory path for the vehicle trajectory routes illustrated in FIG. 4.

Referring to FIG. 5A, the crossed line (each point marked with "x") corresponds to the position covariance for each point of the path of minimum distance while the open line (each point marked with a circle) corresponds to the corresponding position covariance for the trajectory path calculated as described in method 200, for example. As known to one having ordinary skill, the covariance of a measurement describes the error or cost associated with the measurement. Since the minimum distance traverses a shorter distance, there are less points than the open line path. FIG. 5A illustrates that the trajectory cost of the minimum distance path is much higher than that of the minimum distance, or crossed line, path. For many points, there are trajectory cost calculations equal to 10 (since A=10 and B=1); these would correspond to edgeless features in the respective subregions. Although there are some points with high trajectory cost for the open line path, it has very few in comparison with the minimum distance path and the other points correspond to very low cost regions with features. For example, assuming there are 0 edge pixels in a given region (as is present for many points in the minimum distance path) then the trajectory cost for those regions would be calculated as 10 (assuming A=10 and B=1). Using those same parameters, a trajectory cost for a region with 9 edge pixels would correspond to a trajectory cost of 1, a magnitude of 10 difference. Thus, even a short difference of edge pixels in a given region between traversing the minimum distance path and the open line path can substantially reduce the trajectory cost associated when traversing the open line path.

This difference is further illustrated in FIG. 5B, which illustrates the cumulative trajectory cost along each trajectory path. As shown in FIG. 5B, the total trajectory cost, or cumulative position covariance, calculated using the minimum distance path has a value well over 900 m$^2$, whereas the total trajectory cost, or cumulative position covariance, calculated using the open line path is approximately 100 m$^2$. The difference between the two paths can be magnified even more when traversing through terrains with large quantities of edge features that are not within the path of minimum distance.

FIGS. 6A and 6B illustrate another example simulation of planning a vehicle trajectory that minimizes the sum of cost along the path.

FIG. 6A is an exemplary edge map of a given terrain area used for the simulation. The edge map contains a substantial amount of edge features and, in contrast to FIG. 4A, corresponds to an urban settlement (for example), or any other terrain with a high density of edge features.

FIG. 6B is a graphical representation of a vehicle trajectory path 602 as compared with a minimal distance path 600 between the vehicle and a target location. As shown in FIG. 6B, the minimal distance path 600 is not much different than trajectory path 602, compared to the large difference between minimum distance path 400 and navigation performance path 402, due to the larger concentration of distinctive edge features with information content between the starting point ("START") and target location ("END"). This relationship is further demonstrated with respect to FIGS. 7A-7B, which shows graphical representations of the position covariance and cumulated position covariance, respectively, between the two paths. Since the minimum distance path 600 traverses through more edge features with information content, the position covariance for each point along the path is generally less than the position covariance calculated in FIG. 5A. However, the cumulated position covariance of trajectory path 602 is still substantially less than the cumulated position covariance of path 600 even though trajectory path 602 covers only slightly more total distance than path 600, as shown in FIG. 7B.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

EXAMPLE EMBODIMENTS

Example 1 includes a method comprising: obtaining an edge map representation corresponding to one or more terrain images of a given area; identifying a total number of edge pixels in each of a plurality of sub-regions of the edge map representation; determining a measurement probability density function (PDF) for each of the sub-regions based on the number of edge pixels with information content in each sub-region; computing a trajectory cost for each of the sub-regions by dividing a user-selected scalar by a sum of: a user-selected value and the number of edge pixels with information content in each sub-region; and selecting a trajectory for navigation of a vehicle over the given area based on the trajectory cost for each of the sub-regions.

Example 2 includes the method of Example 1, wherein the trajectory cost is a computed covariance of the measurement PDF.

Example 3 includes the method of any of Examples 1-2, wherein selecting the trajectory for navigation further comprises selecting a trajectory that reduces or minimizes the trajectory cost for each of the sub-regions.

Example 4 includes the method of any of Examples 1-3, wherein the user-selected scalar is determined based on a dimension of the plurality of sub-regions.

Example 5 includes the method of any of Examples 1-4, wherein the plurality of sub-regions is determined based on an area of the one or more terrain images of a given area.

Example 6 includes the method of any of Examples 1-5, wherein the vehicle is an aircraft.

Example 7 includes the method of any of Examples 1-6, wherein computing the trajectory cost for each of the sub-regions further comprises computing the trajectory cost a priori.

Example 8 includes the method of any of Examples 1-7, wherein computing the trajectory cost comprises: dividing the user-selected scalar by a sum of: the user-selected value, and the number of edge pixels with information content in each sub-region, to generate an information cost parameter; and summing the information cost parameter with a hazard cost parameter, wherein the hazard cost parameter is a quantity representing a hazard associated with the respective sub-region.

Example 9 includes a program product comprising non-transitory computer readable medium having instructions stored thereon that when executable by at least one processor, causes the at least one processor to: obtain an edge map representation corresponding to one or more terrain images of a given area; identify a total number of edge pixels in each of a plurality of sub-regions of the edge map representation; determine a measurement probability density function (PDF) for each of the sub-regions based on the number of edge pixels with information content in each sub-region; compute a trajectory cost for each of the sub-regions by dividing a user-selected scalar by a sum of: a user-selected value and the number of edge pixels with information content in each sub-region; and select a trajectory for navigation of a vehicle over the given area based on the trajectory cost for each of the sub-regions.

Example 10 includes the program product of Example 9, wherein the trajectory cost is a computed covariance of the measurement PDF.

Example 11 includes the program product of any of Examples 9-10, wherein to select the trajectory for navigation further comprises selected trajectory that reduces or minimizes the trajectory cost for each of the sub-regions.

Example 12 includes the program product of any of Examples 9-11, wherein the user-selected scalar is determined based on a dimension of the plurality of sub-regions.

Example 13 includes the program product of any of Examples 9-12, wherein the vehicle is an aircraft, and wherein to compute the trajectory cost comprises computing the trajectory cost by the equation:

$$\text{Cost} = \frac{A}{B + \alpha},$$

where A is the user-selected scalar, B is the user-selected value, and $\alpha$ is the number of edge pixels with information content in each sub-region.

Example 14 includes the program product of any of Examples 9-13, wherein to compute the trajectory cost for each of the sub-regions further comprises compute the trajectory cost a priori.

Example 15 includes the program product of any of Examples 9-14, wherein to compute the trajectory cost comprises: divide the user-selected scalar by a sum of: the user-selected value, and the number of edge pixels with information content in each sub-region, to generate an information cost parameter, and sum the information cost parameter with a hazard cost parameter, wherein the hazard cost parameter is a quantity representing a hazard associated with the respective sub-region.

Example 16 includes a system, comprising: a processing system coupled to a vehicle, wherein the processing system is operative to: obtain an edge map representation corresponding to one or more terrain images of a given area, identify a total number of edge pixels in each of a plurality of sub-regions of the edge map representation, determine a measurement probability density function (PDF) for each of the sub-regions based on the number of edge pixels with information content in each sub-region, compute a trajectory cost for each of the sub-regions by dividing a user-selected scalar by a sum of: a user-selected value and the number of edge pixels with information content in each sub-region, and select a trajectory for navigation of a vehicle over the given area based on the trajectory cost of the measurement PDF for each of the sub-regions of the given area; and at least one additional system coupled to the processing system, the at least one additional system operative to adjust a navigation parameter of the vehicle based on the trajectory.

Example 17 includes the system of Example 16, wherein the at least one additional system comprises one of a navigation system or a flight control, wherein the navigation system comprises at least one of an inertial measurement unit and a global navigation satellite system (GNSS) receiver.

Example 18 includes the system of any of Examples 16-17, wherein the vehicle is an aircraft.

Example 19 includes the system of any of Examples 16-18, further comprising at least one vison sensor coupled to the processing system, wherein the at least one vision sensor is configured to acquire one or more images of the given area below the vehicle.

Example 20 includes the system of any of Examples 16-19, further comprising a user interface coupled to the processing system, wherein the processing system is further configured to adjust the user-selected scalar and the user-selected value based on data sent by the user interface.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   capturing one or more terrain images of a given area over which a vehicle traverses, the terrain images captured with at least one vision sensor onboard the vehicle;
   sending image data from the at least one vision sensor to a processor onboard the vehicle, the processor hosting a probability density function (PDF) filter, the image data corresponding to the one or more terrain images of the given area;
   creating an edge map representation, in the processor, based on the image data corresponding to the one or more terrain images of the given area;
   identifying, in the processor, a total number of edge pixels in each of a plurality of sub-regions of the edge map representation;
   determining, in the PDF filter, a measurement PDF for each of the sub-regions based on the number of edge pixels with information content in each sub-region;
   computing, in the processor, a trajectory cost for each of the sub-regions by dividing a user-selected scalar by a sum of: a user-selected value and the number of edge pixels with information content in each sub-region;
   selecting, in the processor, a trajectory for navigation of the vehicle over the given area based on the trajectory cost for each of the sub-regions; and
   adjusting a velocity of the vehicle in real-time in response to the selected trajectory.

2. The method of claim 1, wherein the trajectory cost is a computed covariance of the measurement PDF.

3. The method of claim 1, wherein selecting the trajectory for navigation further comprises selecting a trajectory that reduces or minimizes the trajectory cost for each of the sub-regions.

4. The method of claim 1, wherein the user-selected scalar is determined based on a dimension of the plurality of sub-regions.

5. The method of claim 1, wherein the plurality of sub-regions is determined based on an area of the one or more terrain images of a given area.

6. The method of claim 1, wherein the vehicle is an aircraft.

7. The method of claim 1, wherein computing the trajectory cost comprises:
   dividing the user-selected scalar by a sum of: the user-selected value, and the number of edge pixels with information content in each sub-region, to generate an information cost parameter; and
   summing the information cost parameter with a hazard cost parameter, wherein the hazard cost parameter is a quantity representing a hazard associated with the respective sub-region.

8. A program product comprising non-transitory computer readable medium having instructions stored thereon that when executable by at least one processor, causes the at least one processor to:
   obtain an edge map representation corresponding to one or more terrain images of a given area by a process comprising:
   creating the edge map representation based on one or more terrain images of the given area captured by at least one vison sensor onboard a vehicle;
   creating the edge map representation based on one or more terrain map images of the given area retrieved from a map database onboard the vehicle; or
   retrieving the edge map representation corresponding to one or more terrain images of the given area from the map database;
   identify a total number of edge pixels in each of a plurality of sub-regions of the edge map representation;
   determine a measurement probability density function (PDF), using a PDF filter hosted by the at least one processor, for each of the sub-regions based on the number of edge pixels with information content in each sub-region; compute a trajectory cost for each of the sub-regions by dividing a user-selected scalar by a sum of: a user-selected value and the number of edge pixels with information content in each sub-region;
   select a trajectory for navigation of the vehicle over the given area based on the trajectory cost for each of the sub-regions; and
   adjust a velocity of the vehicle in real-time in response to the selected trajectory.

9. The program product of claim 8, wherein the trajectory cost is a computed covariance of the measurement.

10. The program product of claim 8, wherein to select the trajectory for navigation further comprises select the trajectory that reduces or minimizes the trajectory cost for each of the sub-regions.

11. The program product of claim 8 wherein the user-selected scalar is determined based on a dimension of the plurality of sub-regions.

12. The program product of claim 8, wherein the vehicle is an aircraft, and wherein to compute the trajectory cost comprises computing the trajectory cost by the equation:

$$\text{Cost} = A/B + \alpha$$

where A is the user-selected scalar, B is the user-selected value, and a is the number of edge pixels with information content in each sub-region.

13. The program product of claim 8, wherein to compute the trajectory cost for each of the sub-regions further comprises compute the trajectory cost a priori.

14. The program product of claim 8 wherein to compute the trajectory cost comprises:
   divide the user-selected scalar by a sum of: the user-selected value, and the number of edge pixels with information content in each sub-region, to generate an information cost parameter, and
   sum the information cost parameter with a hazard cost parameter, wherein the hazard cost parameter is a quantity representing a hazard associated with the respective sub-region.

15. A system, comprising:
   at least one vison sensor onboard a vehicle, the at least one vision sensor configured to capture one or more terrain images of a given area over which the vehicle traverses;
   a map database onboard the vehicle, the map database configured to store one or more terrain map images of a given area, or an edge map representation of one or more terrain map images of a given area;
   a processing system onboard the vehicle, the processing system in operative communication with the at least one vison sensor and the map database, wherein the processing system hosts a probability density function (PDF) filter; and
   a navigation system onboard the vehicle, the navigation system in operative communication with the processing system;
   wherein the processing system is operative to:
   obtain an edge map representation corresponding to one or more terrain images of a given area by a process comprising:
   creating the edge map representation based on one or more terrain images of the given area captured by the at least one vison sensor;
   creating the edge map representation based on one or more terrain map images of the given area retrieved from the map database; or
   retrieving the edge map representation corresponding to one or more terrain images of the given area from the map database;
   identify a total number of edge pixels in each of a plurality of sub-regions of the edge map representation,
   determine, in the PDF filter, a measurement PDF for each of the sub-regions based on the number of edge pixels with information content in each sub-region,
   compute a trajectory cost for each of the sub-regions by dividing a user-selected scalar by a sum of: a user-selected value and the number of edge pixels with information content in each sub-region,
   select a trajectory for navigation of a vehicle over the given area based on the trajectory cost of the measurement PDF for each of the sub-regions of the given area; and
   adjust a velocity of the vehicle in real-time in response to the selected trajectory.

16. The system of claim 15, further comprising at least one additional system coupled to the processing system, the at least one additional system operative to adjust a navigation parameter of the vehicle based on the trajectory;
   wherein the at least one additional system comprises a flight control, wherein the navigation system comprises at least one of an inertial measurement unit and a global navigation satellite system (GNSS) receiver.

17. The system of claim 15, wherein the vehicle is an aircraft.

18. The system of claim 17, wherein the at least one vision sensor is configured to acquire one or more images of the given area below the aircraft.

19. The system of claim 15, further comprising a user interface coupled to the processing system, wherein the processing system is further configured to adjust the user-selected scalar and the user-selected value based on data sent by the user interface.

* * * * *